Oct. 18, 1938.   R. L. STAMBACK   2,133,674
LIQUID TESTING DEVICE
Filed June 16, 1936   2 Sheets-Sheet 1
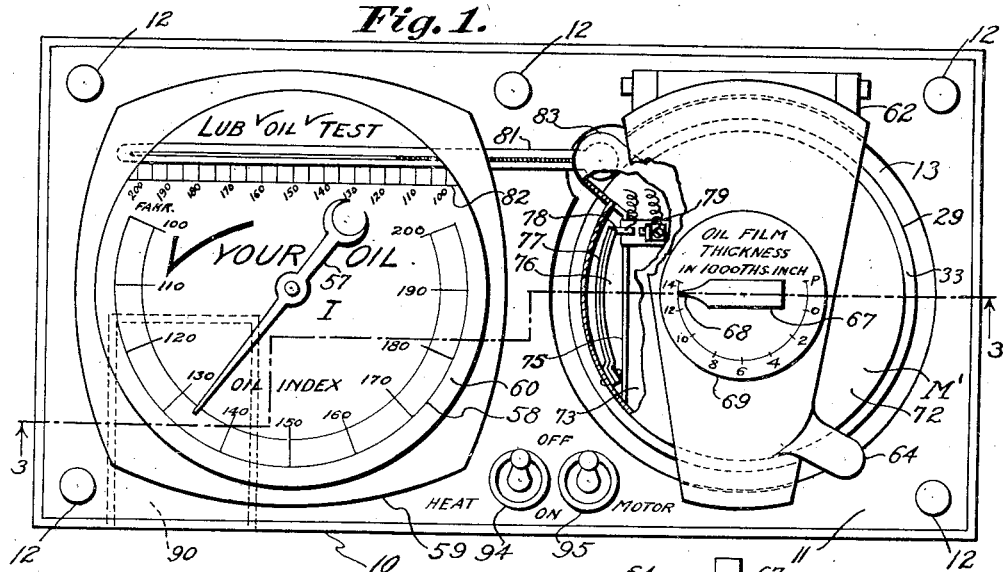
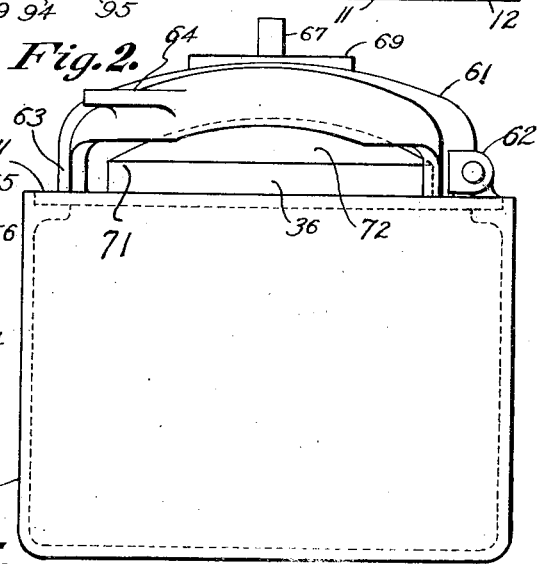
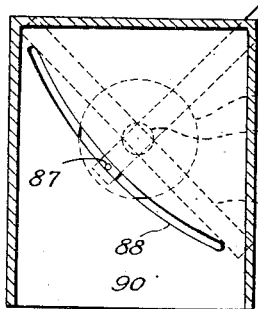
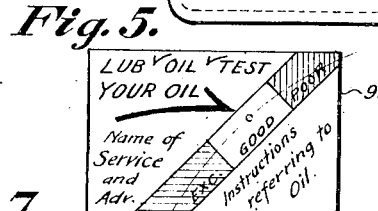
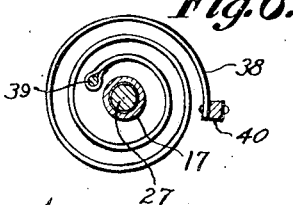
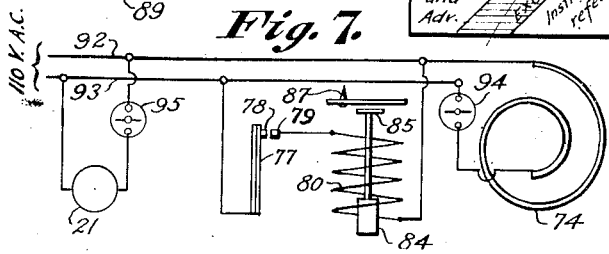
Inventor:
Rollo L. Stamback
by Meun, Anderson + Liddy
Attorneys.

Oct. 18, 1938.　　　　R. L. STAMBACK　　　2,133,674
LIQUID TESTING DEVICE
Filed June 16, 1936　　　　2 Sheets-Sheet 2

Inventor:
Rollo L. Stamback
by
Mann, Anderson & Liddy
Attorneys.

Patented Oct. 18, 1938

2,133,674

UNITED STATES PATENT OFFICE 2,133,674

LIQUID TESTING DEVICE

Rollo L. Stamback, Long Beach, Calif., assignor of one-half to William R. Mayhew, Alhambra, Calif.

Application June 16, 1936, Serial No. 85,468

11 Claims. (Cl. 265—2)

This invention relates generally to the art of testing liquids to determine various properties thereof, such as intermolecular friction, surface tension, viscosity, etc.

An object of the invention is to provide a testing device particularly adapted, although not necessarily, for the testing of lubricants such as oils and greases for machinery, and which is structurally and functionally characterized to enable a test of oil for its lubricating and other properties to be made accurately, expeditiously and with but a negligible quantity of lubricant necessary to conduct the test; to enable an indication and/or a permanent record to be conveniently made as desired; and to enable the device to be readily cleaned of oil following a test.

Another object of the invention is to provide a lubricant testing device which is compact, is simple and dependable in operation, and can be manufactured at a reasonable cost.

A further object of the invention is to provide a lubricant testing device which embodies fixed and rotary members having juxtaposed surfaces between which the lubricant to be tested can be placed to form a film in contact with the surfaces for co-action therewith in creating a drag upon the rotary element which bears a definite relationship to the intermolecular friction or lubricating property of the oil, and which is utilized as a basis for activating an indicator and/or a recorder, in order that an accurate comparison of the oil under test with a predetermined standard lubricating value for such oil can be made.

With these and other objects in view, the invention consists in the following combinations and arrangements of elements as set forth in the following specification and particularly brought out in the appended claims.

In the accompanying drawings,

Figure 1 is a plan view of the lubricant testing device embodying this invention;

Figure 2 is a right end view of the lubricant testing device;

Figure 4 is a horizontal sectional view taken on the line 4—4 of Figure 3;

Figure 5 is a plan view of a chart which can be used in making a record of the test;

Figure 6 is a horizontal sectional view taken on the line 6—6 of Figure 3;

Figure 7 is a diagrammatic view of an electrical circuit embodied in the invention.

Figure 3:
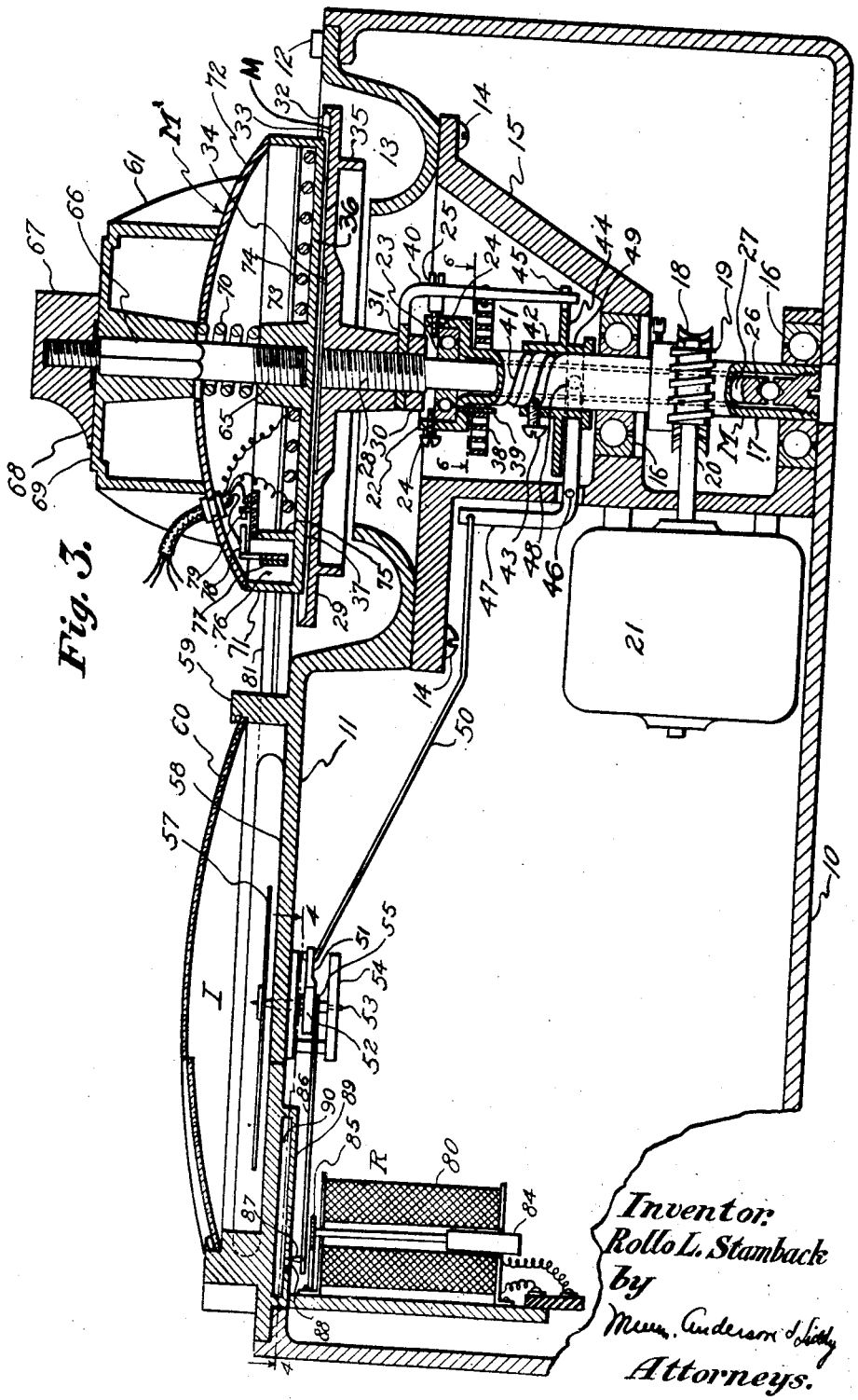
Figure 3 is a vertical sectional view taken on the line 3—3 of Figure 1.

Referring specifically to the drawings, the invention comprises a rectangular casing 10 having its open top closed by a removable cover in the form of a rectangular metal plate 11 secured in place by screws 12. The plate 11 provides a support for the mechanism of the invention, and at one end is depressed to provide an annular sump 13 to the flat bottom of which is secured by screws 14 a depending bracket 15 supporting anti-friction bearings 16—16 for a vertical drive shaft 17 of tubular construction as clearly shown in Figure 3. Between the bearings 16 a worm wheel 18 is fixed and constantly meshes with a worm 19 fixed to the shaft 20 of an electric motor 21 for driving the shaft 18 at a speed of approximately fifty R. P. M. in the counterclockwise direction as viewed in plan in Figure 1.

The upper end of the drive shaft 17 terminates in a cup 22 in which an anti-friction bearing 23 is fixed by means of screws 24—24 of which one has a relatively large head adapted to function as a stop 25 in the manner and for a purpose to be later described. At its lower end the drive shaft 17 is provided with a ball thrust bearing 26 on which is supported within the drive shaft and in co-axial relationship thereto a shaft 27, the upper portion of which is journaled in the bearing 23.

Above the bearing 23, the shaft 27 is enlarged and externally threaded at 28 to receive a rotary member M with which is adapted to co-act a fixed member M', in the testing of a lubricant.

The member M is in the form of a metal disk 29 which is locked to the shaft 27 by a nut 30 and a washer 31. The disk 29 is provided with a peripheral retaining lip 32 surrounding its flat top surface 33 on which a relatively small quantity of oil to be tested is adapted to be placed. The central portion of the surface 33 is recessed to provide a shallow well 34, which may be .002" or more in depth. From the disk depends an annular flange 35 for draining into the sump 13 such oil which spills over the marginal edge of the disk during the testing operation.

The fixed member M' is in the form of a disk 36 of smaller diameter than the disk 29 and having its flat bottom surface 37 adapted to be juxtaposed in confronting parallel relationship to the top surface 33 of the disk 29 so that a quantity of lubricant placed on the latter surface will form a lubricant film in contact with the surfaces.

The rotary member M is operatively connected to the drive shaft 17 by a flat spiral spring 38 coiled about the shaft immediately below the cup 22. The inner end of the spring is secured to the shaft 17 by a pin 39, whereas the outer end of the spring is secured to an arm 40 extending axially of the shaft at one side thereof and being formed integrally with the washer 31 so that in effect the outer end of the spring is fixed to the rotary member.

The spring 38 normally urges the rotary member rotatively in a counterclockwise direction as viewed in Figure 1 to an extreme position limited by engagement of the arm 40 with the aforestated stop 25, yet yields to any drag imposed on the rotary member by the lubricant film between the surfaces 33 and 37. When the rotary member is being driven in the counterclockwise direction through the spring, so that the rotary member is rendered free to respond to the drag by a retrograde rotative movement relative to the drive shaft, which movement is in proportion to the magnitude of the drag.

The relative rotating movement of the rotary member M is utilized in determining the lubricating and other properties of a lubricant by the provision of an indicator I and/or a recorder R. For this purpose the drive shaft 17 is provided above the upper bearing 16 with left hand external threads 41 with which co-acts a nut 42 in the form of a sleeve from which projects a pin 43 into engagement with the threads. The nut 42 is provided with a flange 44 the periphery of which has a notch 45 slidably receiving the arm 40 to compel the nut to rotate with the rotary member, yet be free for screwing movement on the shaft 17 in one direction axially or the other in response to rotative movement of the rotary member relative to the shaft 17 by or in opposition to the spring 38.

Pivoted at 46 on the bracket 15 is a bell crank lever 47, one arm of which is provided with a pin 48 projecting into an annular groove 49 in the nut 42 so as to rock the lever in response to axial movement of the nut. The other arm of the lever 47 is connected to one end of a link 50, the other end of which is connected to an arm 51 of a segmental gear 52 pivoted at 53 on a frame 54 beneath the cover plate 11, and meshing with a gear pinion 55 fixed to a vertical shaft 56 journaled in the frame 54 and projecting through the cover plate to receive an indicating hand 57 adapted to traverse a dial 58 graduated either in Saybolt units or some other units of measurement which may be found more desirable or simple to use. The dial 58 is enclosed in a case formed by a ring 59 on the cover plate spanned by a transparent protecting panel 60.

In the present instance, the member M' which is in effect a fixed member in its operative relationship to the rotary member M is supported by an arm 61 hinged at 62 and having a foot 63 adapted to rest upon the cover plate 11, the arm also having a finger piece 64 by which it and the member can be swung upwardly in order to permit access to be had to the rotary member for the supply of a quantity of lubricant thereto for testing, or for the removal of the lubricant from both members following a test.

The member M' is mounted on the arm 61 for adjustment in a direction which is axially of the members when in the operative relationship shown in Figure 3 so as to enable the thickness of the film of lubricant between the surfaces 33 and 37 to be varied in accordance with different types and grades of lubricant. For this purpose, the member M' is fixed axially to a stud 65 having a non-circular portion 66 passing through a correspondingly shaped opening in the arm 61 and having its outer end threaded to receive a knob 67 provided with a pointer 68 adapted to traverse a dial 69 on the arm as the knob is rotated. A coil spring 70 on the stud 65 between the arm and the member M' urges the latter toward the disk. The dial 69 is graduated in terms of thousandths of an inch from fourteen thousandths which is the maximum spacing between the surfaces 33 and 37 provided in the present embodiment. The adjustment of the member M' is graduated from this maximum distance to a zero position in contact with the member M and a further position in which pressure is applied to the member M by the weight of the member M' for the testing of greases and lubricants containing a foreign lubricating filler such as graphite. It will be apparent that by rotating the knob 67 in a clockwise direction as viewed in Figure 1 that the member M' will be drawn upwardly or away from the member M, and that reverse rotation of the knob will permit the spring 70 to act in reversely adjusting the member M'.

The member M' is provided with an upstanding marginal rim 71 spanned by a dome-shaped cover 72 to provide in the member a heating chamber 73, the bottom wall of which forms the surface 37 and supports an electrical heating element 74. The heating chamber is provided at one side thereof with a partition 75 forming a compartment 76 containing a bi-metallic thermostatic element 77 one end of which is fixed to the rim 71. The other end of the element 77 is free and has fixed thereto a movable contact 78 to close an electrical circuit including a solenoid 80, when the chamber 73 has been heated to a predetermined temperature.

In order that the temperature within the chamber 73 shall be indicated at all times, a thermometer 81 is supported on the cover plate 11 and has one end extended into the case formed by the ring 59 for co-action of the fluid in the thermometer tube with a scale 82 graduated in Fahrenheit degrees of temperature from one hundred to two hundred. The other and ball end of the thermometer tube is received within an inverted cup-shaped projection 83 from the rim 71 so as to receive the chamber heat by conduction through the rim and projection when the member M' is in operative relationship to the member M.

The solenoid 80 is supported vertically beneath the cover plate 11, and its core 84 has fixed to its upper end a cross bar 85 disposed beneath and in intersecting relation to an arm 87 fixed to the segmental gear 52 and carrying at its outer end a punch 87 adapted when the solenoid is energized to be projected through an arcuate slot 88 formed in the bottom wall 89 of a shallow chart receiving compartment 90 in the casing 10. A chart 91 is adapted to be inserted into the compartment 90 through an opening in the side wall of the casing and is delineated to provide separate zones, respectively, marked "excellent", "good", "poor", which have reference to conditions of a lubricant. It will be understood that irrespective of the position of the punch 87 along the length of the slot 88 as determined from the position of the nut 42 axially along the drive shaft 17, that upon energization of the solenoid 80 when a predetermined temperature is reached in the chamber 73, the cross bar 85 will strike the arm 86 to cause the punch to penetrate the chart 91 in the zone corresponding to the condition of the lubricant being tested.

From a consideration of Figure 7, it will be noted that the heating element 74 is connected across the line wires 92 and 93 under the control of a switch 94; that the winding of the solenoid 80 is connected across the line wires under the control of the thermo-responsive switch formed by the contacts 78 and 79; and that the motor 21 is also connected across the line wires under the control of a switch 95.

The operation of the invention is as follows:

Approximately one teaspoonful (6 c. c.) of oil to be tested is placed on the surface 33 of the member M, following which the member M' is lowered to the position shown in Figure 3 to bring its surface 37 in contact with the oil which forms a film between the surfaces. The necessary adjustment of the member M* by means of the knob 67 is now effected and it is to be understood that the clearance between the surfaces 33 and 37 should be in accordance with the S. A. E. rating of the oil being tested. For example, it has been found in practice that the settings for oils of 10, 20 and 30 S. A. E. ratings should be .002", .003" and .004", respectively.

The high setting or greater clearances are intended for greases. The P position on the dial 69 is desirable for some types of oil, such as oil containing graphite.

After proper axial adjustment of the member M' has been made in accordance with the type and grade of oil to be tested, the switch 94 is closed to supply current to the heating element 74 and the switch 95 is also closed to supply current to the motor 21.

As the oil between the members M and M' is comparatively cold and thus reacts against the surfaces 33 and 37 to impose a maximum drag upon the member M against its rotation by the drive shaft 17 through the spring 38, the member M will shift rotatively in a retrograde direction relative to the direction of rotation of the drive shaft, and in opposition to the urging action of the spring 38 until a balanced condition between the drag and spring loading exists. This retrograde movement is generally sufficient to cause the nut 42 to be moved axially upward on the drive shaft to an extreme position wherein the indicating hand 57 of the indicator I will indicate the highest reading on the dial 58 which in the present instance will be 200.

As the oil between the members M and M' is heated, the drag of the lubricant imposed on the rotating member M lessens, thus rendering the spring 38 free to reversely shift the member M rotatively which will be in the same direction as the direction of rotation of the drive shaft 17. The nut will, of course, be reversely actuated to move axially downward on the drive shaft, thus moving the hand 57 toward the lower readings on the dial 58. This reverse motion of the member M continues so long as the heat of the oil rises, and ceases when a balance is reached between the lubricant drag and the spring loading under a condition in which the oil remains at a uniform temperature.

In practice, it has been found desirable to make the thermostatic element 77 responsive to a temperature of 150° Fahrenheit so as to close the contacts 78 and 79 at this temperature and thereby energize the solenoid 80 to actuate the punch 87. Thus a chart 91 previously placed in the compartment 90 will be punched at some point along the lengths of the zones in accordance with the condition of oil under test, it being understood that the position occupied by the punch is dependent on the drag imposed on the member M by the oil through the intervening mechanism and operative connections. In cases wherein it is desired to plot graph curves, the heating of the oil is permitted to continue until the hand 57 has reached the lowest reading on the dial 58, at which time the switch 94 is opened.

As the oil starts to cool, readings on the dial 57 can be taken every 5 or 10 degrees of temperature, thus providing the necessary information for the plotting of the curve.

It will be apparent that the principle of operation of the device is based on the theory that a measured volume of oil contains a definite number of oil globules, depending on the crude from which the oil was refined, foreign ingredients added at the time of refining, and method of refining. The number of globules will also vary from use in a machine, due to accumulated foreign substances, such as gasoline, carbon, moisture, air and sludge, any or all of which can be present in lubricant in an automobile engine.

Such foreign matter will, of course, displace a number of oil globules in a measured quantity of oil, and it will be evident that any foreign matter mixed with the oil tends to break down the electron attraction between the oil globules by placing them further apart, thereby breaking down the resistance of the oil. Thus the drag imposed by the oil on the member M will vary in proportion to the number of oil globules in a given volume, so that with the temperature of the oil known, its lubricating value relative to a predetermined standard lubricating value for such oil will be indicated and recorded by the device.

It is to be noted that by the provision of the well 34, the oil when heated is caused to be forced towards the peripheries of the members M and M' under a molecular stress resulting from the combined motion of the rotary member M and atmospheric air pressure imposed on and resisting movement of the oil at the peripheries of the members. This induced flow insures a uniform capillary motion of the lubricant film between the surfaces, as has been found in practice to produce consistently accurate readings. This action sets up a greater internal friction between the molecules of the oil which as a mass is adhering to the surfaces 33 and 37. The internal friction thus created manifests itself by the drag imposed on the disk M, which drag bears a definite relationship to the lubricating value of the oil, so as to provide an accurate and dependable basis for comparison of different oils when new or used.

What is claimed is:

1. A lubricant testing device comprising a fixed member and a rotary member having juxtaposed surfaces between which a quantity of lubricant to be tested can be placed to form a film in contact with the surfaces; means for heating the lubricant under test; driving means; means by which the driving means will be caused to drive the rotary member while rendering the latter shiftable rotatively relative to the driving means in accordance with the amount of drag imposed on the rotary member by the lubricant film; recording means operatively associated with the rotary member for the making of a record in accordance with the relative motion of the rotary member; and thermo-responsive means for activating the recording means to produce a record when the lubricant under test has been heated to a predetermined temperature.

2. A lubricant testing device comprising a fixed member and a rotary member having juxtaposed surfaces between which a quantity of lubricant to be tested can be placed to form a film in contact with the surfaces; means for heating the lubricant under test; driving means; means by which the driving means will be caused to drive the rotary member while rendering the latter shiftable rotatively relative to the driving means in accordance with the amount of drag imposed on the rotary member by the lubricant film; a chart; a punch; means for moving the punch to various predetermined positions across the chart in accordance with the extent of relative movement of the rotary member; electro-magnetic means for actuating the punch; and an electric circuit including a source of current, the electro-magnetic means and a thermo-responsive switch for closing the circuit to supply current to the electro-magnetic means when the lubricant has been heated to a predetermined temperature.

3. A lubricant testing device comprising two relatively rotatable members having juxtaposed surfaces between which a quantity of lubricant can be placed to form a film in contact with the surfaces; a drive shaft co-axially arranged with respect to the rotary member and having a stop; yieldable means operatively connecting the drive shaft and rotary member to urge the latter rotatively in one direction to one extreme position relative to said stop during rotation of the drive shaft in said one direction yet yielding in response to a drag imposed on the rotary member by the lubricant film so as to render the rotary member shiftable rotatively relative to the drive shaft in one direction or the other according as the drag increases or decreases; and means for utilizing the aforestated shifting motion of the rotary member in the making of an indication and/or a record.

4. A lubricant testing device comprising two relatively rotatable members having juxtaposed surfaces between which a quantity of lubricant can be placed to form a film in contact with the surfaces; a drive shaft coaxially arranged with respect to the rotary member and having a stop; yieldable means operatively connecting the drive shaft and rotary member to urge the latter rotatively in one direction to one extreme position relative to said stop during rotation of the drive shaft in said one direction yet yielding in response to a drag imposed on the rotary member by the lubricant film so as to render the rotary member shiftable rotatively relative to the drive shaft in one direction or the other according as the drag increases or decreases; a feed screw on the drive shaft; a nut mounted on the feed screw; an operative connection compelling the nut to rotate with the rotary member yet be free for feeding axially on the feed screw when the aforestated shifting of the rotary member relative to the drive shaft occurs; and means for utilizing the axial motion of the nut in the making of an indication and/or a record.

5. A lubricant testing device comprising fixed and rotatable members having juxtaposed surfaces between which a quantity of lubricant can be placed to form a film in contact with the surfaces; a shaft to which the rotary member is fixed; a tubular drive shaft in which the first shaft is journaled; a spring operatively connecting the drive shaft and rotary member to urge the latter in one direction to one rotatively extreme position relative to the drive shaft; a feed screw on the drive shaft; a nut on the feed screw; an operative connection compelling the nut to rotate with the rotary member yet be feedable by said screw so that rotative movement of the rotary member relative to the drive shaft in one direction or the other in accordance with variations in drag imposed on the rotary member by the lubricant film, will cause the screw and nut to co-act in feeding the latter along the screw; and means for utilizing the feeding motion of the nut in the making of an indication and/or a record.

6. A lubricant testing device comprising fixed and rotatable members having juxtaposed surfaces between which a quantity of lubricant can be placed to form a film in contact with the surfaces; a shaft to which the rotary member is fixed; a tubular drive shaft in which the first shaft is journaled; a spring operatively connecting the drive shaft and rotary member to urge the latter in one direction to one rotatively extreme position relative to the drive shaft; a feed screw on the drive shaft; a nut on the feed screw; a stop on the drive shaft; an arm on the rotary member urged by said spring to engage the stop and being operatively connected to the nut to compel the latter to rotate with the rotary member yet be feedable on said screw when rotative movement of the rotary member relative to the drive shaft is effected in response to a drag imposed on the rotary member by the lubricant film; and means for utilizing the feeding motion of the nut in the making of an indication and/or a record.

7. A lubricant testing device comprising two relatively rotatable members having juxtaposed surfaces between which a quantity of lubricant can be placed to form a film in contact with the surfaces; a drive shaft co-axially arranged with respect to the rotary member and having a stop; yieldable means operatively connecting the drive shaft and rotary member to urge the latter rotatively in one direction to one extreme position relative to said stop during rotation of the drive shaft in said one direction yet yielding in response to a drag imposed on the rotary member by the lubricant film so as to render the rotary member shiftable rotatively relative to the drive shaft in one direction or the other according as the drag increases or decreases; means for utilizing the aforestated shifting motion of the rotary member in the making of an indication and/or a record; means for mounting the other member for adjustment axially towards and away from the rotary member; and means for adjusting said other member to occupy various predetermined positions.

8. A lubricant testing device comprising fixed and rotatable members having horizontally disposed contiguous surfaces in confronting relationship, between which lubricant is adapted to be placed to form a film in contact with the surfaces; means for driving the rotary member; and means for utilizing the drag imposed by the lubricant between said surfaces, on the rotary member when driven, to determine lubricating and other properties of the lubricant; the rotary member being lowermost and its surface being recessed centrally thereof to define a well by which sufficient lubricant is caused to be retained between the surfaces for co-action therewith in insuring an accurate test.

9. A lubricant testing device comprising superposed vertically axised and relatively rotatable members; means for hingedly mounting the upper member for adjustment bodily from a lowered position wherein the members are juxtaposed in confronting relationship for the testing of lubricant between the members, to a raised position wherein the members are accessible for the application of lubricant to and its removal from the members; means for driving the rotary member; and means for utilizing the drag imposed by lubricant between the members, to determine lubricating and/or other properties of the lubricant.

10. A lubricant testing device comprising relatively rotatable members having surfaces between which lubricant to be tested can be placed to form a film in contact with the surfaces; means for heating the lubricant under test; means for driving the rotary member; means for utilizing the drag imposed by lubricant between said surfaces, to determine lubricating and/or other properties of the lubricant; recording means operatively associated with the members for the making of a record in accordance with the drag imposed by the lubricant between said surfaces; and thermo-responsive means operatively associated with the recording means to activate the latter and produce a record when the lubricant under test has been heated to a predetermined temperature.

11. A lubricant testing device comprising relatively rotatable members having horizontally disposed contiguous surfaces in confronting relationship, between which lubricant can be placed to form a film in contact with the surfaces; means for mounting said members to operate in space during a test; means for driving the rotary member; means for utilizing the drag imposed by the lubricant between said surfaces, on the rotary member when driven, to determine a property of the lubricant; one of said members having its film contacting surface recessed centrally thereof to provide space between the members by which sufficient lubricant is caused to be retained between the surfaces of the members to insure an accurate test.

ROLLO L. STAMBACK.